US012121165B2

(12) United States Patent
Chen

(10) Patent No.: US 12,121,165 B2
(45) Date of Patent: Oct. 22, 2024

(54) LIGHT EFFECT STRUCTURE FOR ELECTRONIC PHOTO FRAME

(71) Applicant: Juanzhi Chen, Shenzhen (CN)

(72) Inventor: Juanzhi Chen, Shenzhen (CN)

( * ) Notice: Subject to any disclaimer, the term of this patent is extended or adjusted under 35 U.S.C. 154(b) by 0 days.

(21) Appl. No.: 18/611,870

(22) Filed: Mar. 21, 2024

(65) Prior Publication Data

US 2024/0225317 A1 Jul. 11, 2024

(30) Foreign Application Priority Data

Mar. 12, 2024 (CN) ......................... 202420480754.0

(51) Int. Cl.
*F21V 33/00* (2006.01)
*A47G 1/06* (2006.01)
(Continued)

(52) U.S. Cl.
CPC ........ *A47G 1/0622* (2013.01); *F21V 23/0485* (2013.01); *F21V 33/0032* (2013.01); *F21Y 2105/16* (2016.08)

(58) Field of Classification Search
CPC ........................... F21V 23/0485; A47G 1/0622
See application file for complete search history.

(56) References Cited

U.S. PATENT DOCUMENTS

2004/0074129 A1* 4/2004 Carlson ................ A47G 1/0622 40/714
2012/0320622 A1* 12/2012 Sanders .................. G09F 23/00 362/602

(Continued)

FOREIGN PATENT DOCUMENTS

KR 101843320 B1 * 9/2017 .............. F21V 17/10
WO WO-2020167037 A1 * 8/2020 ........... A47G 1/0622

*Primary Examiner* — Zheng Song
(74) *Attorney, Agent, or Firm* — Daniel M. Cohn; Howard M. Cohn

(57) ABSTRACT

The present disclosure provides a light effect structure for an electronic photo frame, and relates to the technical field of electronic photo frames. The light effect structure for an electronic photo frame includes a photo frame assembly and a light effect assembly that is mounted on the photo frame assembly, where the photo frame assembly comprises a back housing and a display that is mounted in the back housing, and the light effect assembly includes a main board, a light board, and a speaker that are mounted in the back housing, the display, the light board, and the speaker are all electrically connected to the main board, and a touch switch is integrated on the main board and configured to switch light effect of the light board. When an image is displayed on the display, light of the light board may be changed through the light effect assembly with a background color of the picture displayed on the display. When music is played, light of the light board is changed with a music rhythm. This greatly increases appreciation of the light effect structure for an electronic photo frame, so that display effect is not stagnant. In addition, the light board may be switched to a breathing light mode or a fixed single color mode. This improves atmospheres. The light effect structure for an electronic photo frame has a specific lighting function, and can be used as a night light. Furthermore, the light effect structure for an electronic photo frame has a simple and compact structure, and has a broad application prospect.

5 Claims, 7 Drawing Sheets

(51) Int. Cl.
*F21V 23/04* (2006.01)
*F21Y 105/16* (2016.01)

(56) References Cited

U.S. PATENT DOCUMENTS

| | | | | |
|---|---|---|---|---|
| 2015/0016092 | A1* | 1/2015 | Mullin | F21V 33/0032 362/97.4 |
| 2017/0357113 | A1* | 12/2017 | Yamazaki | G02B 5/3016 |
| 2018/0259177 | A1* | 9/2018 | Wagoner | F21V 7/0008 |
| 2018/0300019 | A1* | 10/2018 | Lee | G06F 3/0488 |
| 2019/0253670 | A1* | 8/2019 | Chien | F21S 4/28 |
| 2021/0081156 | A1* | 3/2021 | Saavedra | A47G 1/065 |
| 2021/0219747 | A1* | 7/2021 | Schorsch | G09F 13/18 |
| 2023/0134321 | A1* | 5/2023 | Carr | A47G 1/0622 40/714 |
| 2023/0175659 | A1* | 6/2023 | Schaak | G02B 6/0083 362/613 |

* cited by examiner

LIGHT EFFECT STRUCTURE FOR ELECTRONIC PHOTO FRAME

TECHNICAL FIELD

The present disclosure relates to the technical field of electronic photo frames, and in particular to a light effect structure for an electronic photo frame.

BACKGROUND

An electronic photo frame is a hardware version of a digital album, also known as digital photo frame. The electronic photo frame is a multimedia playback device similar to a conventional photo frame, and is an electronic product that can display digital photo graphics on an LCD panel through a dynamic display of an electronic medium. Only one photo may be put in the conventional photo frame, but a large quantity of digital photos may be copied into the digital album in a data transmission manner of a USB. A single photo or multiple photos may be played according to personal preference. Therefore, the electronic photo frame has multiple a variety of playback effects. This enables a small photo frame to have functions of slides. Therefore, the electronic photo frame is modern and fashionable.

An existing electronic photo frame only has a function for a user to observe images. The user cannot intuitively observe the images, display effect is single, and the usage effect is not ideal.

SUMMARY

To achieve the above objective, the present disclosure provides the following technical solutions: A light effect structure for an electronic photo frame includes a photo frame assembly and a light effect assembly that is mounted on the photo frame assembly, where the photo frame assembly comprises a back housing and a display that is mounted in the back housing, and the light effect assembly includes a main board, a light board, and a speaker that are mounted in the back housing, the display, the light board, and the speaker are all electrically connected to the main board, and a touch switch is integrated on the main board and configured to switch light effect of the light board.

As a preferred technical solution of the present disclosure, there are a plurality of light boards, and the plurality of light boards form one of a circle, square, and polygon.

As a preferred technical solution of the present disclosure, a Type-C interface, a memory card slot, and a power interface are integrated on a side of the main board, there are two speakers, and the two speakers are symmetrically disposed.

As a preferred technical solution of the present disclosure, a display switch is integrated on a side of the main board, and a switch button whose one end extends to an external portion of the back housing is disposed on the display switch.

As a preferred technical solution of the present disclosure, the photo frame assembly further includes a decorative frame, a face housing, and a TP screen, the TP screen is disposed on a side of the display, and the TP screen and the display are electrically connected to the main board through a flexible flat cable.

As a preferred technical solution of the present disclosure, a clamping groove is disposed on a circle of the back housing, a face housing buckle that is clamped with the clamping groove is disposed on a circle of an inner wall of the face housing, the decorative frame is movably disposed on an external portion of the face housing, a decorative frame buckle that is clamped with the back housing is disposed on a side of the decorative frame, and the decorative frame is made of one of wood and plastic.

As a preferred technical solution of the present disclosure, a heat dissipation groove is disposed on a side, away from a face housing, of the back housing, a fixing groove that is used to mount the speaker is disposed in the back housing, a touch mark corresponding to the touch switch is disposed on the side, away from the face housing, of the back housing, and the touch switch is triggered by touching the touch mark, to switch the light effect of the light board.

As a preferred technical solution of the present disclosure, a threaded head is disposed on one end of the photo frame bracket, a connection groove is disposed on a side, away from a face housing, of the back housing, and the photo frame bracket is mounted in the connection groove through the threaded head.

As a preferred technical solution of the present disclosure, an interface groove recessed in the back housing is disposed on a side, away from a face housing, of the back housing, and configured to expose a Type-C interface, a memory card slot, and a power interface, a hanging hole that is located on an external side of the interface groove is disposed on a side of the back housing, and there is at least one hanging hole.

As a preferred technical solution of the present disclosure, a light groove is disposed on a side, away from a face housing, of the back housing, and configured to expose a light bead on the light board, a light shade is movably disposed in the light groove, and at least one light shade buckle that is clamped with the light groove is disposed on a side of the light shade.

As a preferred technical solution of the present disclosure, compared with the prior art, the light effect structure for an electronic photo frame provided by the present disclosure has the following beneficial effect:

According to the light effect structure for an electronic photo frame, when an image is displayed on the display, light of the light board may be changed through the light effect assembly with a background color of the picture displayed on the display. When music is played, light of the light board is changed with a music rhythm. This greatly increases appreciation of the light effect structure for an electronic photo frame, so that display effect is not stagnant. In addition, the light board may be switched to a breathing light mode or a fixed single color mode. This improves atmospheres. The light effect structure for an electronic photo frame has a specific lighting function, and can be used as a night light. Furthermore, the light effect structure for an electronic photo frame has a simple and compact structure, and has a broad application prospect.

Figure 1:
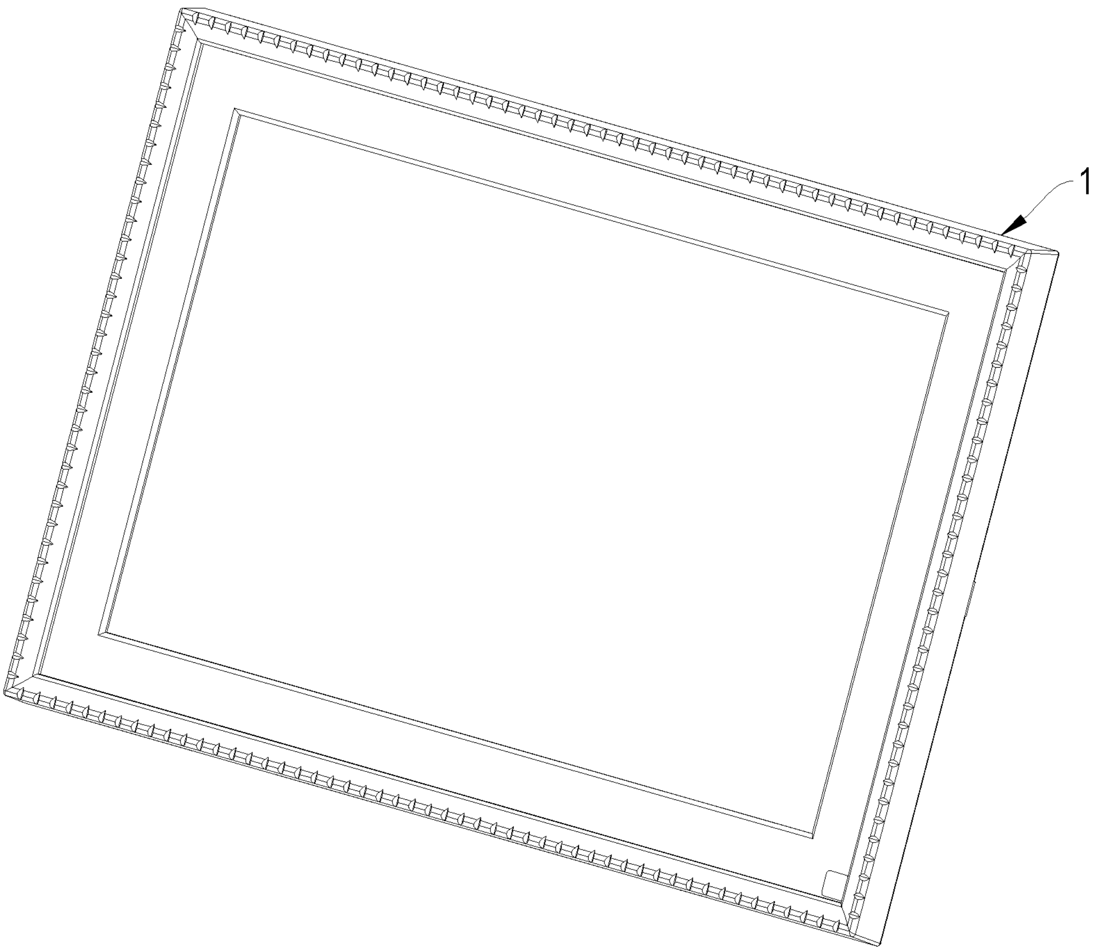
FIG. 1 is a schematic diagram of a structure of a light effect structure for an electronic photo frame according to an embodiment of the present disclosure.

Reference Numerals: 1, photo frame assembly; 11, decorative frame; 111, decorative frame buckle; 12, face housing; 121, face housing buckle; 13, TP screen; 14, display; 15, back housing; 151, heat dissipation groove; 152, card slot; 153, fixing groove; 154, touch mark; 155, connection groove; 156, interface groove; 157, hanging hole; 158, light groove; 16, light shade; 161, light shade buckle; 2, light effect assembly; 21, main board; 22, light board; 23, speaker; 24, Type-C interface; 25, memory card slot; 26, power interface; 27, display switch; 271, switch button; 28, touch switch; 29, flexible flat cable; 3, photo frame bracket; 31, threaded head.

DETAILED DESCRIPTION OF EMBODIMENT

In order to enable those skilled in the art to more clearly understand the technical solution of the present disclosure, the embodiments of the present disclosure are described in detail below with reference to the accompanying drawings. The accompanying drawings are only used for reference, and do not constitute any limitation to the embodiments of the present disclosure. In the following description, for ease of explanation, many specific details are illustrated to provide a comprehensive understanding of the embodiments of the present disclosure. However, one or more embodiments can be implemented without these specific details. In other cases, to simplify the accompanying drawings, well-known structures and devices may be shown in a simplified manner.

The terms "first", "second", and so on in the specification and claims of the present disclosure are intended to distinguish between similar objects but do not necessarily indicate a specific order or sequence. It should be understood that the data termed in such a way is interchangeable in proper circumstances such that the embodiments of the present disclosure described herein can be implemented in other orders than the order illustrated or described herein. In addition, terms "include", "have", or any other variant thereof are intended to cover a non-exclusive inclusion.

In the embodiments of the present disclosure, the terms such as "upper", "lower", "inside", "middle", "outside", "front", and "rear" indicate the orientation or positional relationship shown in the accompanying drawings. These terms are mainly intended to better describe the embodiments of the present disclosure, rather than to define that the device, elements, or components indicated must have the specific orientation or be constructed and operated in the specific orientation. Besides, some of the terms mentioned above may be used to indicate other meanings in addition to indicating the orientation or positional relations. For example, the term "upper" may also be used to indicate an attachment relationship or a connection relationship in some cases. Those of ordinary skill art may understand specific meanings of the foregoing terms in the present disclosed embodiments according to specific circumstances.

Terms such as "disposing", "connection" and "fixing" should be understood in a broad sense. For example, "connection" may be a fixed connection, a detachable connection or an integrated connection, may be a mechanical connection or an electrical connection, may be a direct connection or an indirect connection with use of an intermediate medium, or may be intercommunication between two devices, elements, or components. Those of ordinary skill art may understand specific meanings of the foregoing terms in the present disclosed embodiments according to specific circumstances.

Unless otherwise indicated, "a plurality of" means two or more.

It should be noted that the embodiments in the present disclosure and features in the embodiments may be combined with each other in a non-conflicting manner.

Refer to FIG. 1 to FIG. 7. A light effect structure for an electronic photo frame includes a photo frame assembly 1 and a light effect assembly 2 that is mounted on the photo frame assembly 1. The photo frame assembly 1 includes a back housing 15 and a display 14 that is mounted in the back housing 15. The light effect assembly 2 includes a main board 21, a light board 22, and a speaker 23 that are mounted in the back housing 15. The display 14, the light board 22, and the speaker 23 are all electrically connected to the main board 21, and a touch switch 28 is integrated on the main board 21 and configured to switch light effect of the light board 22. The light board 22 has four light effect modes. The four light effect modes are controlled by touch switch 28. Specific operations are as follows:

Mode 1: Short press the touch switch 28 to open a breathing light mode, light of the light board 22 circularly goes on in three or seven colors.

Mode 2: Short press the touch switch 28, a color of light of the light board 22 is changed by following a background color of a picture that is displaying on the display 14.

Mode 3: Short press the touch switch 28, light of the light board 22 goes on in one of seven colors.

Mode 4: Short press the touch switch 28, when music is played, light of the light board 22 is changed following a music rhythm; and long press the touch switch 28, the light board 22 is closed.

As a specific technical solution of the embodiment, there are a quantity of light boards 22, and the plurality of said light boards 22 form one of a circle, square, or polygon. As shown in FIG. 2 to FIG. 5, in this embodiment, the plurality of light boards 22 form a circle, or form another shape based on a size and shape of the photo frame assembly 1, to ensure light effect display effect.

As a specific technical solution of the embodiment, a Type-C interface 24, a memory card slot 25, and a power interface 26 are integrated on a side of the main board 21, there are two speakers 23, and the two speakers 23 are symmetrically disposed. An image, music, or a video file may be transferred via the Type-C interface 24, the memory card slot 25 is a two-in-one card slot of an SD card and the memory card slot. A memory card may be installed via the memory card slot 25, to obtain an image, music, or a video file. The power interface 26 is connected to a power supply through a data cable. Music may be played through the speaker 23.

As a specific technical solution of the embodiment, a display switch 27 is integrated on a side of the main board 21, and a switch button 271 whose one end extends to an external portion of the back housing 15 is disposed on the display switch 27. The display switch 27 is used to control the display 14, that is, the display 14 may be opened or closed through the display switch 27.

As a specific technical solution of the embodiment, the photo frame assembly 1 further includes a decorative frame 11, a face housing 12, and a TP screen 13. The TP screen 13 is disposed on a side of the display 14, and the TP screen 13 and the display 14 are electrically connected to the main board 21 through a flexible flat cable 29. The TP screen 13 may control the display 14 to switch display content. The TP screen 13 and the display 14 are electrically connected to the main board 21 via the flexible flat cable 29, so that the photo frame assembly 1 is more compact and smaller.

As a specific technical solution of the embodiment, A clamping groove 152 is disposed on a circle of the back housing 15, a face housing buckle 121 that is clamped with the clamping groove 152 is disposed on a circle of an inner wall of the face housing 12, the decorative frame 11 is movably disposed on an external portion of the face housing 12, a decorative frame buckle 111 that is clamped with the back housing 15 is disposed on a side of the decorative frame 11, and the decorative frame 11 is made of one of wood and plastic. The card slot 152 is fitted with the face housing buckle 121, to ensure stability of a connection between the back housing 15 and the face housing 12. After the face housing 12 is connected to the back housing 15, the display 14 and the TP screen 13 are pressed, to ensure stability of the light effect structure for an electronic photo frame. The decorative frame 11 is configured to decorate the photo frame assembly 1. The decorative frame 11 may be made of wood or plastic. The decorative frame 11 covers the face housing 12, and is clamped to the back housing 15 through the decorative frame buckle 111. This facilitates follow-up replacement by the user.

Figure 2:
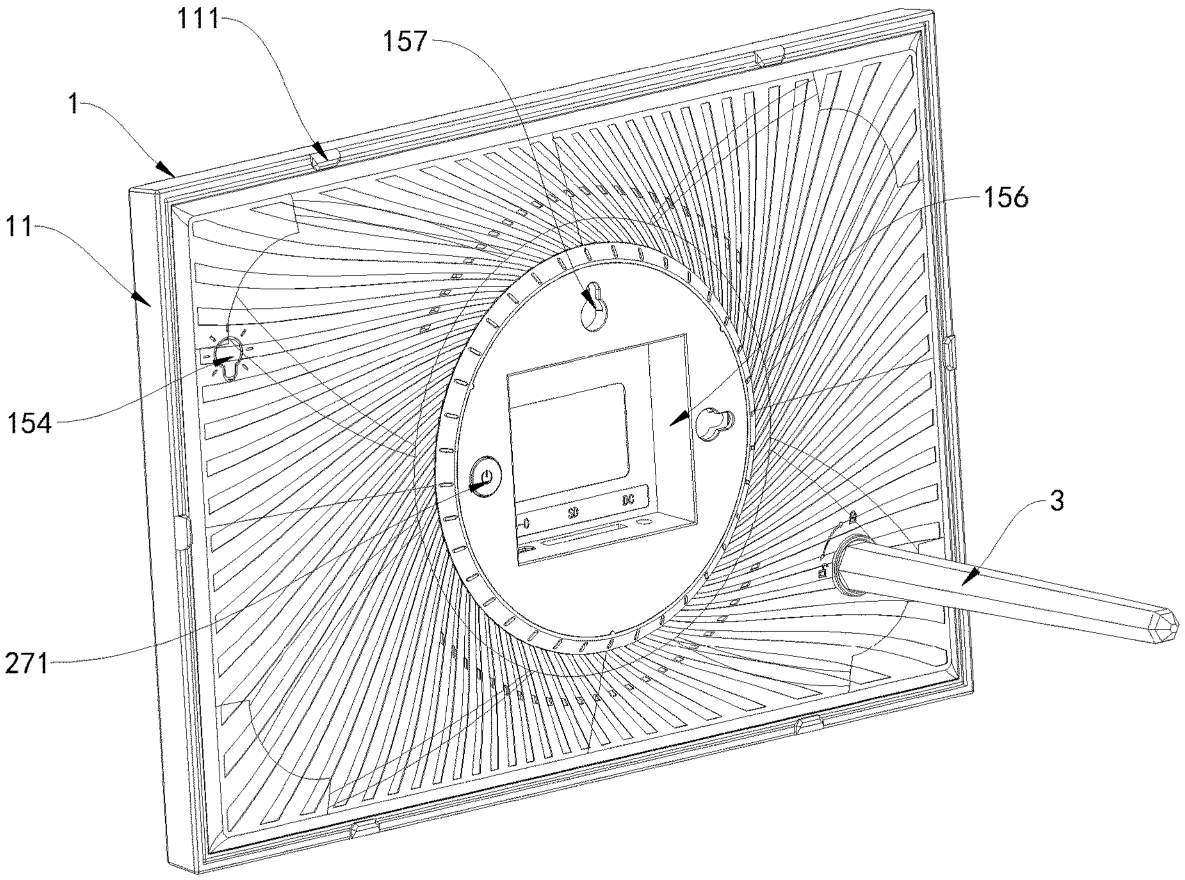
FIG. 2 is a side view of a structure of a photo frame assembly of a light effect structure for an electronic photo frame according to an embodiment of the present disclosure.
Figure 3:
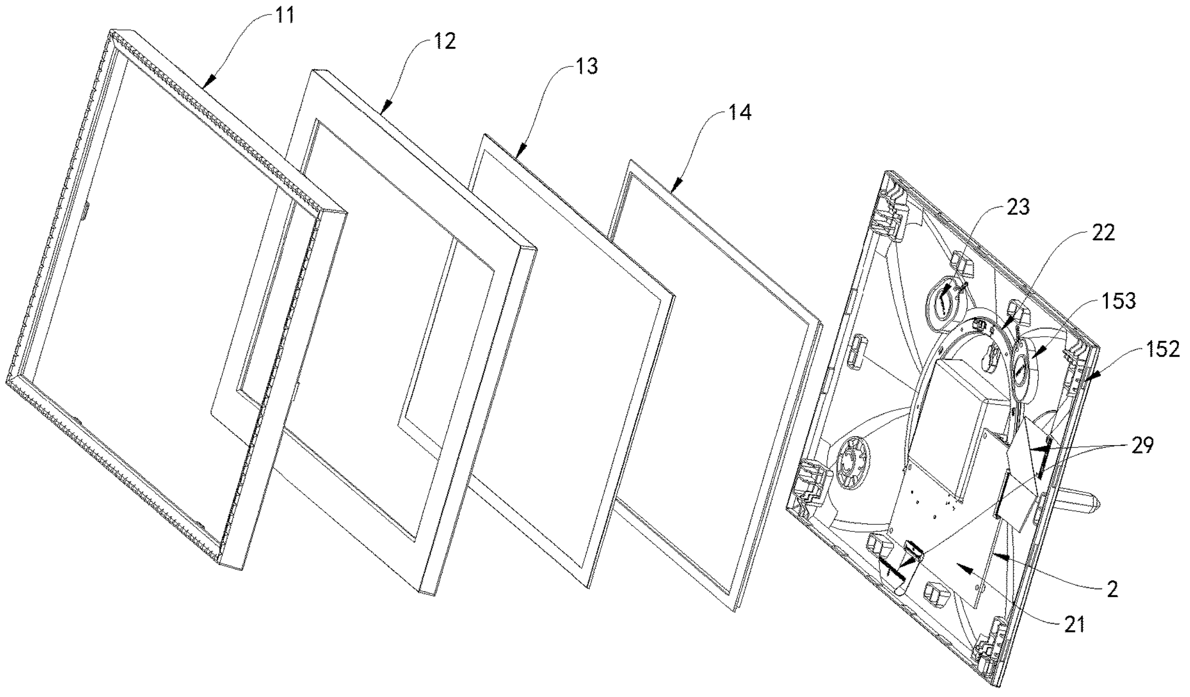
FIG. 3 is an exploded view of a structure of a photo frame assembly of a light effect structure for an electronic photo frame according to an embodiment of the present disclosure.
Figure 4:
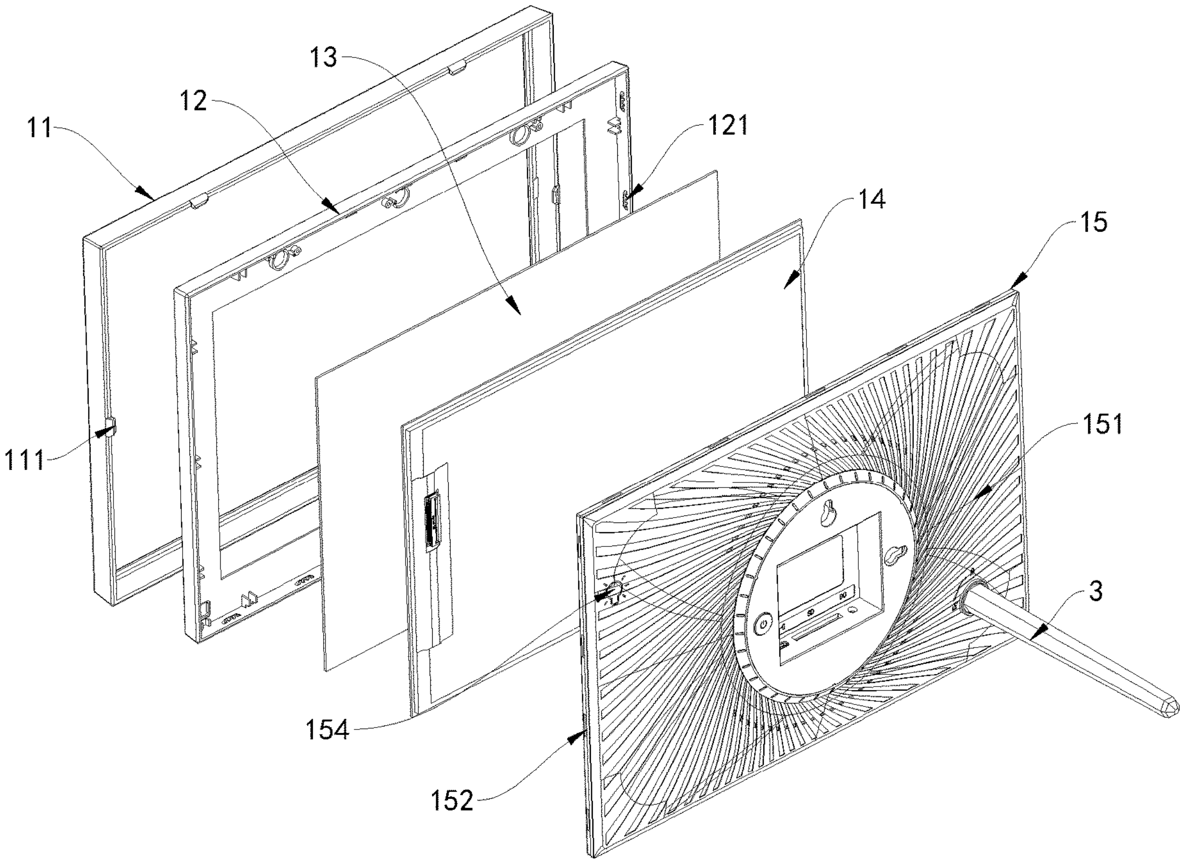
FIG. 4 is an exploded view of a structure of a photo frame assembly of a light effect structure for an electronic photo frame according to an embodiment of the present disclosure.
Figure 5:
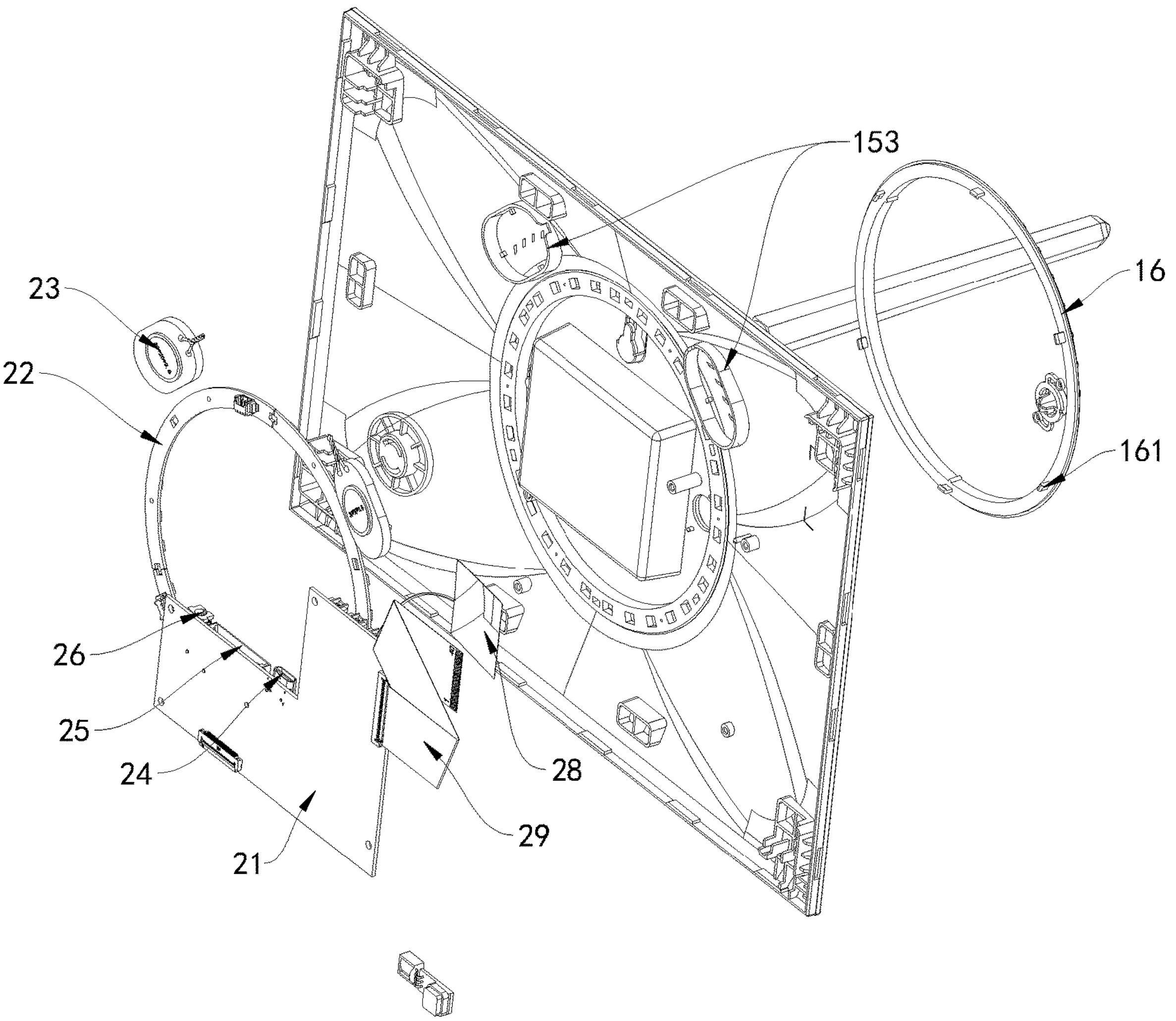
FIG. 5 is an exploded view of a structure of a light effect assembly of a light effect structure for an electronic photo frame according to an embodiment of the present disclosure.
Figure 6:
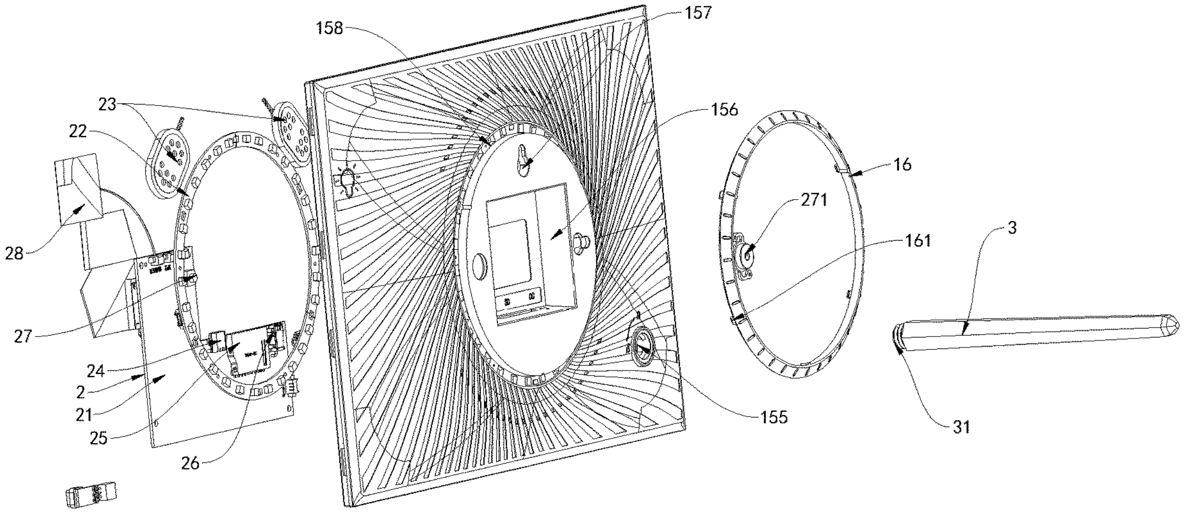
FIG. 6 is an exploded view of a structure of a light effect assembly of a light effect structure for an electronic photo frame according to an embodiment of the present disclosure.
Figure 7:
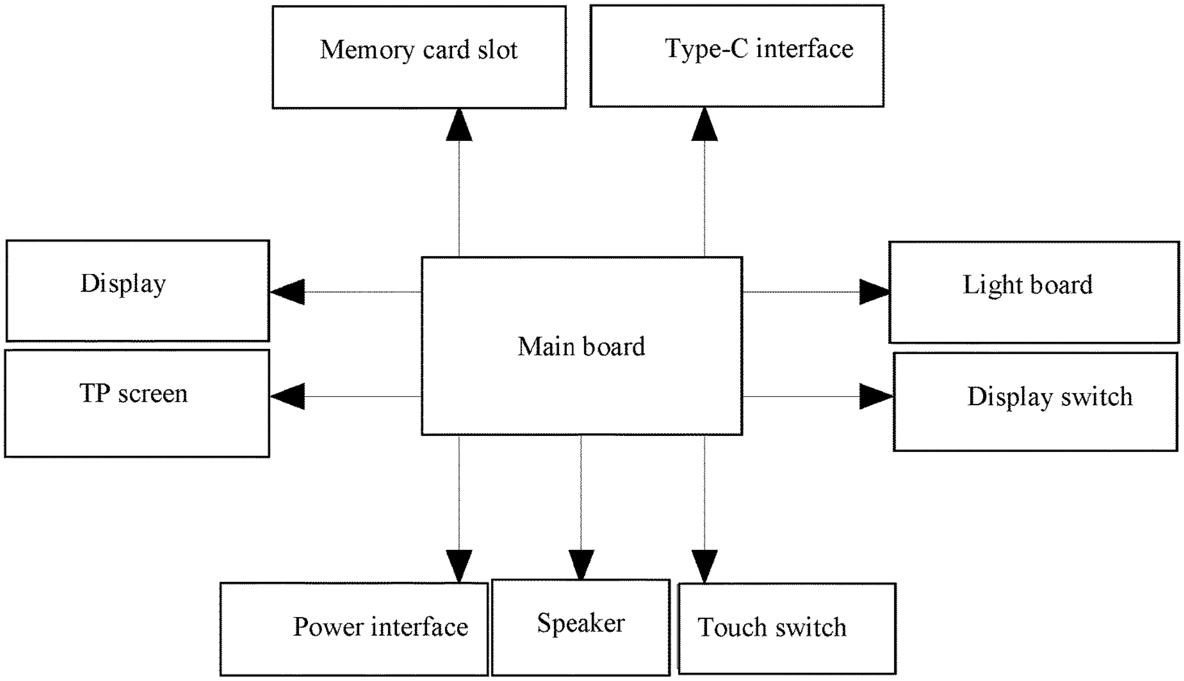
FIG. 7 is a system block diagram of a light effect structure for an electronic photo frame according to an embodiment of the present disclosure.

As a specific technical solution of the embodiment, a heat dissipation groove 151 is disposed on a side, away from a face housing 12, of the back housing 15, a fixing groove 153 that is used to mount the speaker 23 is disposed in the back housing 15, a touch mark 154 corresponding to the touch switch 28 is disposed on the side, away from the face housing 12, of the back housing 15, and the touch switch 28 is triggered by touching the touch mark 154, to switch the light effect of the light board 22. As shown in FIG. 2, the heat dissipation groove 151 is disposed on a side of the back housing 15. The photo frame assembly 1 and the light effect assembly 2 are in a long-term on-state during use. To ensure that high heat is rapidly dissipated when the electronic component is used, a large-area heat dissipation groove 151 is disposed. This ensures usage performance of the light effect structure for an electronic photo, and avoids faults caused due to heat accumulation.

As a specific technical solution of the embodiment, the light effect structure for an electronic photo frame further includes a photo frame bracket 3. A threaded head 31 is disposed on one end of the photo frame bracket 3, a connection groove 155 is disposed on a side, away from a face housing 12, of the back housing 15, and the photo frame bracket 3 is mounted in the connection groove 155 through the threaded head 31. The light effect structure for an electronic photo frame may be directly placed on a desk through the photo frame bracket 3 for use. The photo frame bracket 3 is connected to the connection groove 155 through the threaded head 31, which is simple in operations. This facilitates later assembly and disassembly.

As a specific technical solution of the embodiment, an interface groove 156 recessed in the back housing 15 is disposed on a side, away from a face housing 12, of the back housing 15, and configured to expose a Type-C interface 24, a memory card slot 25, and a power interface 26, a hanging hole 157 that is located on an external side of the interface groove 156 is disposed on a side of the back housing 15, and there is at least one hanging hole 157. The hanging holes 157 are small and large circular holes. The light effect structure for an electronic photo frame may be hung on a wall through fitting of the hanging holes and screws for use. Due to the interface groove 156, the user can easily use the Type-C interface 24, the memory card slot 25, and the power interface 26.

As a specific technical solution of the embodiment, a light groove 158 is disposed on a side, away from a face housing 12, of the back housing 15, and configured to expose a light bead on the light board 22, a light shade 16 is movably disposed in the light groove 158, and at least one light shade buckle 161 that is clamped with the light groove 158 is disposed on a side of the light shade 16. The light shade 16 is clamped with the light groove 158 via the light shade buckle 161. This facilitates later replacement. After the light beads on the light board 22 are lit, light emits through the light shade 16.

In conclusion, according to the light effect structure for an electronic photo frame, when an image is displayed on the display 14, light of the light board 22 may be changed through the light effect assembly 2 with a background color of the picture displayed on the display 14. When music is played, light of the light board 22 is changed with a music rhythm. This greatly increases an ornamental value of the light effect structure for an electronic photo frame, so that display effect is not stagnant. In addition, the light board may be 22 switched to a breathing light mode or a fixed single color mode. This improves atmospheres. The light effect structure for an electronic photo frame has a specific lighting function, and can be used as a night light. Furthermore, the light effect structure for an electronic photo frame has a simple and compact structure, and has a broad application prospect.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

The invention claimed is:

1. A light effect structure for an electronic photo frame, comprising:

a photo frame assembly (1) comprising a back housing (15) and a display (14) mounted in the back housing (15); and a light effect assembly (2) mounted on the photo frame assembly (1), the light effect assembly (2) comprising a main board (21) mounted in the back housing (15), a light board (22) mounted in the back housing (15), a speaker (23) mounted in the back housing (15), and a touch switch (28) integrated on the main board (21) and configured to switch light effect of the light board (22);

wherein the display (14), the light board (22), and the speaker (23) are electrically connected to the main board (21);

wherein the photo frame assembly (1) further comprises a decorative frame (11), a face housing (12), and a touch panel screen (13) disposed on a side of the display (14);

wherein the touch panel screen (13) and the display (14) are electrically connected to the main board (21) through a flexible flat cable (29); and wherein a clamping groove (152) is disposed on a circle of the back housing (15), a face housing buckle (121) clamped with the clamping groove (152) is disposed on a circle of an inner wall of the face housing (12), the decorative frame (11) is movably disposed on an external portion of the face housing (12), a decorative frame buckle (111) clamped with the back housing (15) is disposed on a side of the decorative frame (11), and the decorative frame (11) is made of one of wood and plastic.

2. The light effect structure for an electronic photo frame of claim 1, wherein a heat dissipation groove (151) is disposed on a side, away from a face housing (12), of the back housing (15), a fixing groove (153) that is used to mount the speaker (23) is disposed in the back housing (15), a touch mark (154) corresponding to the touch switch (28) is disposed on the side, away from the face housing (12), of the back housing (15), and the touch switch (28) is triggered by touching the touch mark (154), to switch the light effect of the light board (22).

3. The light effect structure for an electronic photo frame of claim 1, further comprising a photo frame bracket (3), wherein a threaded head (31) is disposed on one end of the photo frame bracket (3), a connection groove (155) is disposed on a side, away from a face housing (12), of the back housing (15), and the photo frame bracket (3) is mounted in the connection groove (155) through the threaded head (31).

4. The light effect structure for an electronic photo frame of claim 1, wherein an interface groove (156) recessed in the back housing (15) is disposed on a side, away from a face housing (12), of the back housing (15), and configured to expose a Type-C interface (24), a memory card slot (25), and a power interface (26), a hanging hole (157) that is located on an external side of the interface groove (156) is disposed on a side of the back housing (15), and there is at least one hanging hole (157).

5. The light effect structure for an electronic photo frame of claim 1, wherein a light groove (158) is disposed on a side, away from a face housing (12), of the back housing (15), and configured to expose a light bead on the light board (22), a light shade (16) is movably disposed in the light groove (158), and at least one light shade buckle (161) that is clamped with the light groove (158) is disposed on a side of the light shade (16).

* * * * *